United States Patent [19]

Vaders

[11] Patent Number: 5,648,140
[45] Date of Patent: Jul. 15, 1997

[54] CONVEYOR AND METHOD FOR CONTINUOUS VACUUM LAMINATION

[75] Inventor: Dennis Henry Vaders, Elkin, N.C.

[73] Assignee: Masonite Corporation, Chicago, Ill.

[21] Appl. No.: 470,984

[22] Filed: Jun. 6, 1995

[51] Int. Cl.[6] .......................... B65G 17/46; B32B 31/00
[52] U.S. Cl. .......................... 428/131; 428/136; 428/137; 198/689.1; 156/382
[58] Field of Search .................... 428/131, 136, 428/137; 198/689.1; 156/382

[56] References Cited

U.S. PATENT DOCUMENTS

| | | | |
|---|---|---|---|
| 3,255,843 | 6/1966 | MacDonald | 53/22 |
| 3,322,598 | 5/1967 | Marks et al. | 156/382 |
| 3,446,686 | 5/1969 | Butler et al. | 156/382 |
| 3,562,859 | 2/1971 | McIntyre | 264/90 |
| 3,587,200 | 6/1971 | Stone et al. | 53/22 |
| 3,632,272 | 1/1972 | Herbener | 264/90 |
| 3,661,486 | 5/1972 | MacDonald | 425/174 |
| 3,889,801 | 6/1975 | Berger | 198/184 |
| 3,895,087 | 7/1975 | Ottinger et al. | 264/46.2 |
| 4,006,909 | 2/1977 | Ollendorf et al. | 279/3 |
| 4,028,166 | 6/1977 | Leonhart | 156/382 |
| 4,177,102 | 12/1979 | Tokuno | 156/472 |
| 4,304,508 | 12/1981 | Wolf | 406/78 |
| 4,402,778 | 9/1983 | Goldsworthy | 156/172 |
| 4,477,243 | 10/1984 | Wallsten | 425/292 |
| 4,953,287 | 9/1990 | West et al. | 29/611 |
| 5,250,144 | 10/1993 | Fitzpatrick-Ellis et al. | 156/556 |
| 5,292,388 | 3/1994 | Candore | 156/64 |
| 5,450,944 | 9/1995 | Bonnet | 198/471.1 |

FOREIGN PATENT DOCUMENTS

| 2331864 | 1/1975 | Germany . |
|---|---|---|
| 902812 | 8/1962 | United Kingdom . |

*Primary Examiner*—William Watkins
*Attorney, Agent, or Firm*—Marshall, O'Toole, Gerstein, Murray & Borun

[57] ABSTRACT

An apparatus for the continuous vacuum lamination of a film to an air-permeable substrate includes a conveyor belt having a plurality of channels disposed along a surface thereof oriented transversely to a direction of travel of a substrate on the conveyor. An aperture connected to a source of vacuum extends through the conveyor belt at each channel.

15 Claims, 1 Drawing Sheet

CONVEYOR AND METHOD FOR CONTINUOUS VACUUM LAMINATION

BACKGROUND OF THE INVENTION

1. Field of the Invention

The invention relates to apparatus for the application of film to an air-permeable substrate and more particularly to an apparatus and continuous method for vacuum lamination of film onto a wood composite substrate.

2. Description of Related Technology

The application of a thin decorative and/or protective plastic film to a surface of a substrate that is substantially planar, but includes a textured or sculptured surface has been conventionally performed by utilizing roll laminators to press the film against the substrate. If the substrate is porous, the fidelity (i.e. conformity of the film to the surface of the substrate) of the laminate may be improved by pulling a vacuum at the side of the substrate opposite the film-covered surface in order to draw the film toward the substrate. Vacuum lamination apparatus which have been utilized in a batch or cyclic lamination processes typically include a perforated plate connected to a vacuum source. The substrate is placed on the plate with the side of the substrate opposite the film-covered surface in contact with the perforated plate. A vacuum is pulled through the perforated plate, thereby drawing the plastic film toward the substrate.

The desirability of laminating film to an air-permeable substrate in a continuous process has lead to experimentation with perforated conveyor belt systems moving across stationary vacuum chambers. However, such systems have failed to provide a reliable seal between the substrate and the vacuum source, particularly if film is being laminated to a textured and/or machined surface of the substrate.

SUMMARY OF THE INVENTION

It is an object of the invention to overcome one or more of the problems described above.

According to the invention, an apparatus for the continuous vacuum lamination of a film to an air-permeable substrate includes a conveyor belt having a plurality of channels disposed along a surface thereof. The channels are oriented transversely to a direction of travel of a substrate on the conveyor. An aperture connected to a source of vacuum extends through the conveyor belt at each channel.

A method according to the invention comprises applying film to a surface of a substrate, conveying the film-covered substrate on a conveying apparatus according to the invention and pulling a vacuum on the substrate through the apertures in the conveyor belt.

Other objects and advantages of the invention will be apparent to those skilled in the art from the following detailed description taken in conjunction with the drawings and the appended claims.

DETAILED DESCRIPTION OF THE INVENTION

Figure 1:
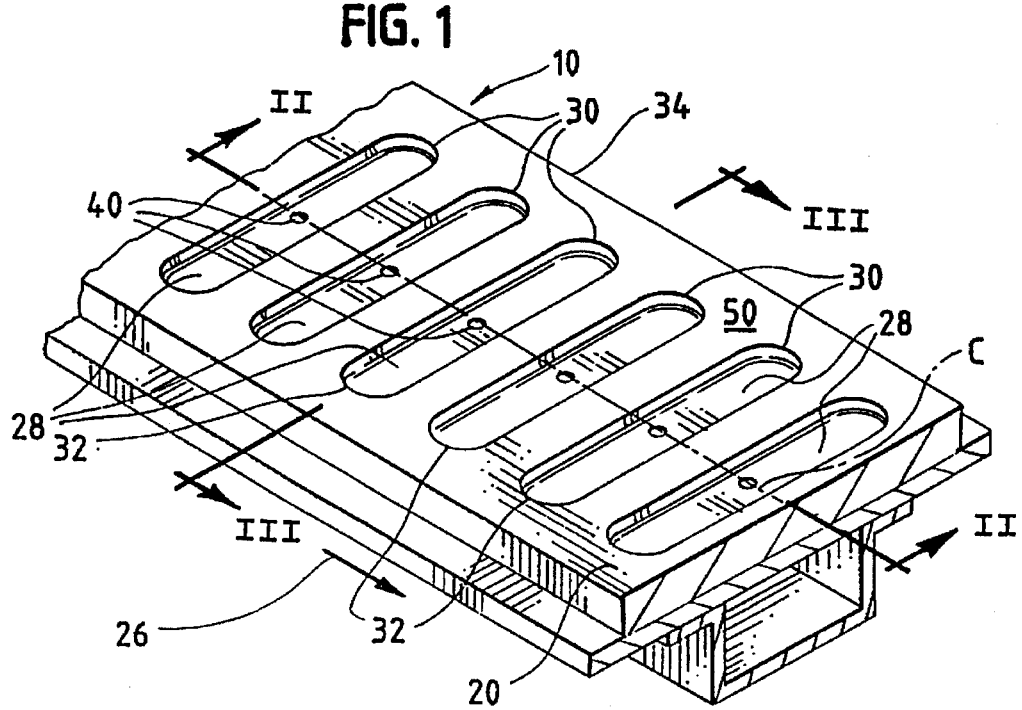
FIG. 1 is a partial perspective view of an apparatus according to the invention.
Figure 2:
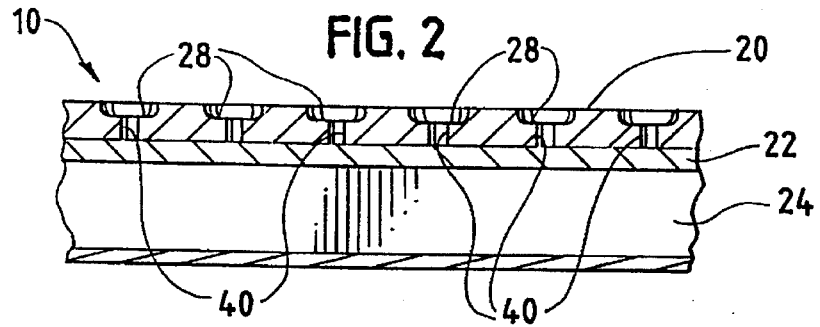
FIG. 2 is an enlarged sectional view taken along the line II—II of FIG. 1
Figure 3:
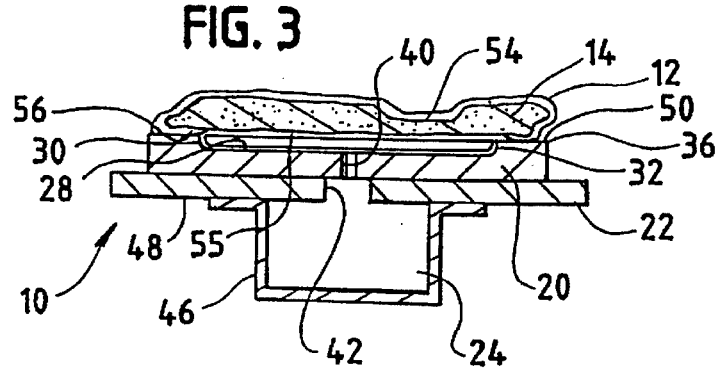
FIG. 3 is an enlarged sectional view taken along the line III—III of FIG. 1 and shown with a film-covered substrate.

With reference to FIGS. 1–3, a vacuum lamination apparatus, generally designated 10, according to the invention for use in a continuous process for laminating a film 12 to an air-permeable substrate 14 includes a conveyor belt 20 supported by a stationary conveyor pan 22 and further including means for providing vacuum illustrated by a vacuum manifold 24.

With reference to FIG. 1, the endless conveyor belt 20 travels in a direction designated by an arrow 26. The belt 20 has a plurality of channels 28 oriented in a direction that is transverse to the direction of travel 26 of the belt 20. Preferably, the channels 28 are of similar length and width, are evenly spaced, and are parallel to one another. Each of the channels 28 has a depth that is less than the thickness of the belt 20. In other words, the channels 28 do not extend completely through the belt 20. Preferably, the channel depth is about 25% to about 75% of the belt thickness. Also, ends 30 and 32 of each of the channels 28 are spaced from edges 34 and 36, respectively, of the belt 20. Each end 30 and 32 is preferably approximately equally spaced from the respective edge 34 and 36.

At least one aperture 40 extends through the belt 20 at each channel 28. Preferably, the apertures 40 are disposed near a center line c of the belt 20 as shown in FIG. 1. Thus, each aperture 40 is disposed approximately at the center of each respective channel 28, also as shown in FIG. 1.

However, each channel 28 may include more than one aperture 40. In such a case, the apertures 40 are preferably disposed in two or more lines, each line being parallel to the direction of travel 26 of the conveyor belt 20.

Each aperture 40 is connected to a source of vacuum shown by the vacuum manifold 24 in FIGS. 2 and 3. The conveyor pan 22 includes at least one slot 42 which extends along a length of the conveyor pan 22 and is in a line parallel to the direction of travel 26 of the conveyor belt 20. The slot 42 is aligned with the apertures 40 to allow for the pull of vacuum from the manifold 24 through the slot 42 and the apertures 40. The manifold 24 also extends along the length of the conveyor pan 22, is disposed beneath the conveyor pan 22, and is defined by walls 46 that are attached to a lower surface 48 of the pan 22 at each side of the slot 42. The manifold 24 also is defined by end walls (not shown) disposed at each end of the apparatus 10 and is connected to a source of vacuum (not shown).

The ends 30 and 32 of the channels 28 are spaced from the edges 34 and 36 of the conveyor belt 20, respectively, (i.e. the channels are inset) a distance sufficient to provide an unchanneled top surface or belt strip 50 near each of the edges 34 and 36. A seal forms between the strips 50 and the substrate 14 (and/or the film 12) when a vacuum is pulled through the apertures 40 and the channels 28.

In operation, conveyor driving means (not shown) drives the conveyor belt 20 in the direction 26 over the conveyor pan 22. So that the conveyor belt 20 contacts the pan 22 and slides smoothly thereover, the pan 22 may include air relief slots (not shown) oriented parallel to the direction of travel 26 of the belt 20 and disposed outside a perimeter of the vacuum manifold 24.

In a method according to the invention, the film 12 is applied to an upper surface 54 of the substrate 14 and the film-covered substrate may be conveyed to the apparatus 10 by a conveyor (not shown). The film-covered substrate is then directed onto the conveyor belt 20 of the apparatus 10 and conveyed along a linear path in the direction 26 from one end of the apparatus 10 to another end thereof. Vacuum is continuously drawn against the substrate 14 at a bottom or underside 55 thereof facing the channels 28 via the apertures 40 of the conveyor belt 20 as the substrate 14 is conveyed across the apparatus 10. As the bottom or underside surface 55 of the substrate 14 contacts the conveyor belt 20, the film 12 is firmly drawn against the upper surface 54 of the substrate.

The vacuum channels 28 allow vacuum to reach a substantial portion of a bottom surface 55 of the substrate 14. Because the belt surface portions 50 located near the edges of the belt 20 are not channeled, a seal is formed between the substrate 14 and the belt 20 along the bottom of the substrate 14 near the edges thereof. If the film 12 is wrapped about the edges of the substrate 14 as shown in FIG. 3, a seal is formed between edge portions 56 of the film 12 and the unchanneled belt strips 50 of the conveyor belt 20. Vacuum being pulled through the manifold 24 reaches the channels 28 by passing through the apertures 40 in the belt and the slot 42 of the conveyor pan 22.

An apparatus and method according to the invention may be utilized to adhere a thin film (such as acrylic or vinyl film of a thickness ranging between about 2 mil and about 3 mil) to a wood composite substrate (e.g., hardboard or oriented strand board). The wood composite substrate may be a panel having a substantially flat bottom surface and a textured or sculptured top surface upon which the film is adhered.

It may be necessary to apply adhesive to the substrate and/or the film prior to placing the film on the substrate. Also, it may be necessary to heat the film-covered substrate to cure the resulting laminated structure. Therefore, an apparatus according to the invention may include a heating mechanism such as a heat lamp or infrared heater (not shown) disposed in the vicinity of the top surface of the conveyor 20 so that the film-covered substrate may be heated during vacuum lamination. The apparatus may also include a forced cooling mechanism (not shown) disposed downstream of the heating mechanism with respect to the direction of travel of a substrate over the apparatus 10.

A channeled conveyor belt of an apparatus according to the invention is designed to provide vacuum to a substrate for an amount of time adequate to satisfactorily adhere a film to the substrate. Thus, variables such as the size and porosity of the substrate and the film thickness are taken into consideration when designing features of the inventive apparatus such as the length of the conveyor belt 20, the size and spacing of the channels 28, the size of the space between the ends of the channels 28 and the edges of the conveyor belt 20, and the conveyor belt speed. The variables of belt length and speed must be considered together because faster belt speeds require longer conveyors. A preferred belt speed is about 300 ft/min. An apparatus according to the invention may include channels 28 that are about ¾-inch wide and spaced about ¾-inch apart, with about one (1) inch between the ends of the channels 28 and the edges of the conveyor belt 20.

The foregoing detailed description is given for clearness of understanding only, and no unnecessary limitations should be understood therefrom, as modifications within the scope of the invention will be apparent to those skilled in the art.

I claim:

1. An apparatus for the continuous vacuum lamination of an air-permeable substrate to a film disposed on a surface of the substrate, said apparatus comprising a non-permeable conveyor belt having a plurality of channels, said channels disposed along a surface of said conveyor belt and oriented in a direction transverse to a direction of travel of a substrate on said conveyor belt, each channel extending substantially across a width of the conveyor belt in said transverse direction, said conveyor belt further having an aperture extending therethrough at each channel, each aperture being connected to a source of vacuum.

2. The apparatus of claim 1 wherein said channels are evenly distributed along a length of the conveyor.

3. The apparatus of claim 1 wherein said conveyor has edges and each of said channels have ends, said ends of said channels being spaced from said edges.

4. The apparatus of claim 3 wherein said conveyor edges are first and second edges and said ends of each of said channels are first and second ends, a first substantially linear unchanneled belt strip being formed between said first edge and said first ends of said channels and a second substantially linear unchanneled belt strip being formed between said second edge and said second ends of said channels.

5. The apparatus of claim 4 wherein a width of said first strip is substantially the same as a width of said second strip.

6. The apparatus of claim 1 wherein the source of vacuum comprises walls defining a vacuum manifold communicating with said apertures.

7. The apparatus of claim 1 further comprising a stationary conveyor pan supporting the conveyor, said pan having a slot for the passage of air from the apertures to the source of vacuum.

8. The apparatus of claim 1 wherein said apertures are aligned approximately parallel to the direction of travel of a substrate on said conveyor.

9. The apparatus of claim 8 wherein the source of vacuum comprises walls defining a vacuum manifold, said manifold aligned with said apertures and communicating therewith.

10. The apparatus of claim 9 further comprising a stationary conveyor pan contacting the conveyor, said pan having a slot for the passage of air from the apertures to the vacuum manifold.

11. The apparatus of claim 10 wherein certain walls defining the vacuum manifold are attached to the conveyor pan.

12. The apparatus of claim 1 wherein said conveyor is an endless conveyor belt.

13. The apparatus of claim 12 wherein said channels have a depth equal to between about 25% and about 75% of a thickness of the conveyor belt.

14. A method of vacuum lamination of a film to an air-permeable substrate comprising:

(a) applying a film to a surface of a substrate;
(b) providing an apparatus for conveying the substrate along a linear path from one end of the apparatus to another end thereof, said apparatus comprising a non-permeable conveyor belt having a plurality of channels disposed along a surface thereof, said channels oriented transversely to a direction of travel of the substrate and extending substantially across a width of the conveyor belt, said conveyor belt having an aperture extending therethrough at each channel, each aperture being connected to a source of vacuum, said conveyor belt having first and second edges and each of said channels having first and second ends, a first substantially linear unchanneled belt strip being formed between said first edge and said first ends of said channels and a second substantially linear unchanneled belt strip being formed between said second edge and said second ends of said channels;

(c) directing the film-covered substrate onto the conveying apparatus provided in step (b) and positioning the substrate to overlap both the first and second unchanneled belt strips; and (d) pulling a vacuum on the substrate through the apertures of the conveyor belt and forming a seal at each of the first and second unchanneled belt strips.

15. The method of claim 14 further comprising the steps of:

(a) applying an amount of film to the substrate sufficient to wrap about at least two edges of the substrate and to provide overlap film portions on a bottom surface of the substrate near each of said two edges; and (b) positioning the film-covered substrate on the conveying apparatus so that the overlap film portions on the bottom surface of the substrate are in direct contact with the first and second substantially linear unchanneled belt strips.

* * * * *